Feb. 17, 1970  R. G. LELAND  3,495,918
DISPOSABLE SWAB AND HOLDER
Filed Dec. 15, 1967
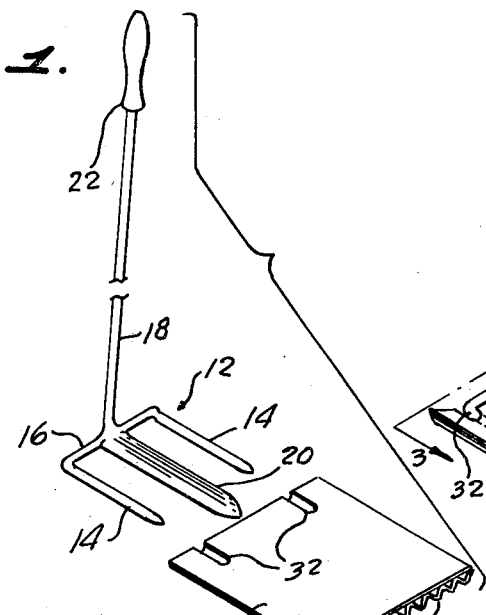
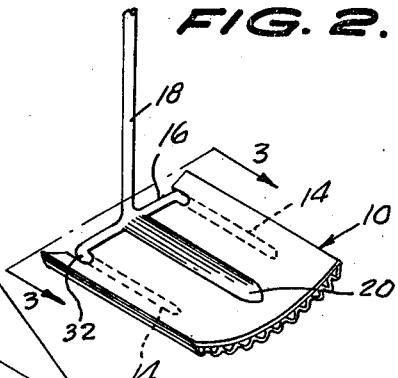
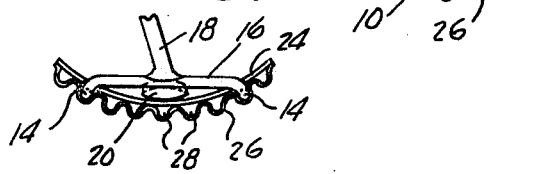
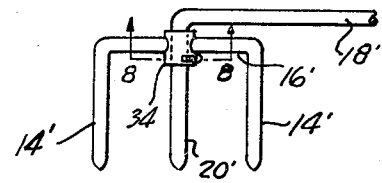
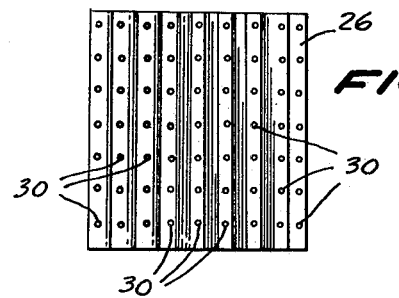
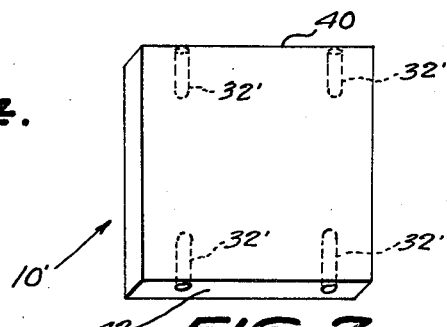
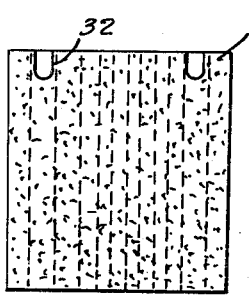
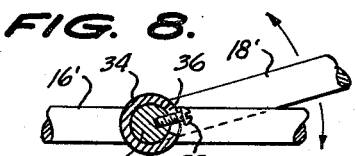
INVENTOR.
RAGNVALD G. LELAND,
BY
ATTORNEYS.

United States Patent Office 3,495,918
Patented Feb. 17, 1970

3,495,918
DISPOSABLE SWAB AND HOLDER
Ragnvald G. Leland, 2334 W. 241st St.,
Lomita, Calif. 90717
Filed Dec. 15, 1967, Ser. No. 690,923
Int. Cl. A47l 17/00, 13/17
U.S. Cl. 401—201
6 Claims

ABSTRACT OF THE DISCLOSURE

A disposable swab and holder, the swab comprising a flat, flexible, resilient member having a pair of spaced openings in at least one side edge thereof, the holder comprising a U-shaped member whose sides form outer tines spaced slightly closer together than said apertures of the swab, and a central tine adapted to engage the upper surface of the swab when the latter is bent into a curve to receive the outer tines in said openings. The holder may be applied to and removed from the swab by sliding the tines into and out of said openings. Preferably, the swab has a thin upper layer and a corrugated lower layer for receiving a detergent to be dispensed through tiny holes in the corrugations while cleaning. After a limited period of use the upper layer will dissolve, or disintegrate, in water and the swab may be disposed of by flushing.

---

This invention relates generally to a disposable cleaning swab and holder therefor, and more particularly to an improved device adapted to clean toilet bowls and other surfaces, and to clean and wax floors and the like, said swab being bent into the form of a quarter-moon for receiving forked prongs of a holder in guide openings in the swab to be retained thereon by tension engendered by such bending.

A primary object of the invention is to provide an improved cleaning swab and holder which may be quickly and easily assembled and as easily and quickly separated after use for disposing of the swab.

Another object of the invention is to provide a simple and inexpensive device, of the character indicated above, which is composed of a small number of uncomplex parts.

A further object of the invention is to provide a practical, efficient, and easily usable device, of the kind indicated, which uses disposable swabs adapted to be flushed down a toilet bowl.

A still further object of the invention is to provide an improved swab and holder, having the above described characteristics, in which the holder is provided with three spaced parallel tines lying substantially in the same plane, the swab being formed of flexible resilient material and having a pair of openings in one side edge spaced further apart than the outer tines of the holder, whereby the swab may be bent into an arched form to receive the outer tines in said openings and to retain the swab on the holder by tension engendered within the swab.

Yet another object of the invention is to provide an improved swab and holder, of the character indicated above, in which the swab is formed of upper and lower layers, or plies, the lower ply being corrugated, and the upper ply being bonded thereto by a dissolvable glue, the upper ply being further provided with notches in one edge which serve to guide the outer tines of the holder into separated corrugations of the lower ply to hold the swab.

Still another object of the invention is to provide an improved cleaning device, of the character indicated above, in which the swab is formed as a block of resilient material having a pair of spaced openings in each of opposite side edges for reception of the outer tines of the holder, whereby the holder may be applied to different sides of the swab to expose different cleaning surfaces.

Yet a further object of the invention is to provide an improved cleaning device, having the above described characteristics, in which the holder comprises a U-shaped member whose sides form said pair of outer tines, the base of the U-shaped member having a collar rotatably receiving a leg portion of a handle to extend therethrough as a central and intermediate tine between the pair of outer tines, the handle being rotatable in said collar through a limited arc so that the swab may be used to clean under low pieces of furniture.

Yet another object of the invention is to provide an improved cleaning device, having the above described characteristics, wherein a cleaning detergent gel may be applied within the corrugation folds of the lower ply of the swab and between the two plies, and said corrugations are pierced by tiny apertures for exit of the detergent during cleaning.

Still another object of the invention is to provide an improved cleaning device, having the above described characteristics, and in which a stronger and larger swab may be substituted for the disolvable swab to enable waxing of a floor, cleaning of furniture and also under the same, and applying a sealer to a roof.

Yet a further object of the invention is to provide an improved cleaning device, having the above described characteristics, wherein the holder is formed of a single element having tines with smooth surfaces to which dirt, insects, and bacteria cannot easily adhere, and which may be easily kept in clean, sanitary condition.

The novel features that are considered characteristics of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is an exploded perspective view showing a swab and holder according to the present invention;

FIG. 2 is a perspective fragmentary view showing the swab assembled on the holder;

FIG. 3 is a fragmentary end elevation taken from line 3—3 of FIG. 2, and looking in the direction of the arrows;

FIG. 4 is a bottom plan view of the swab of FIG. 2, alone;

FIG. 5 is a top plan view of the swab alone;

FIG. 6 is a plan view of a modified form of swab holder;

FIG. 7 is a perspective view taken from above and one side of a modified form of swab; and FIG. 8 is an enlarged, fragmentary, sectional view of the modified holder taken from line 8—8 of FIG. 6, and looking in direction of the arrows.

Referring now in detail to the drawings, FIGS. 1–5 illustrate a preferred embodiment of the invention as comprising a swab 10 and a holder 12. The holder may be formed as an integral unit of plastic material, or of metal parts welded or soldered together. The holder 12 comprises a U-shaped member having sides in the form of round cross-section, spaced, outer tines 14 joined by a straight, offset base 16 whose center is connected to a somewhat inclined handle 18, the lower end of the handle and the center of the base 16 being secured to a central tine 20 spaced between the outer tines 14 and parallel thereto. Preferably, the central tine has an oval cross-section considerably larger than the round cross-sections of the outer tines 14 for a reason which will become apparent later in the description of the mode of securing the swab to the holder. At the upper end of the handle is secured a handgrip 20.

The swab 10 comprises an upper layer, or ply, of thin, flexible paper-like material 24 bonded to a lower ply 26 formed of a resilient corrugated material, the corrugations extending parallel to the tines of the holder when the swab and holder are assembled. The glue, not shown, between the plies 24, 26 is preferably an adhesive capable of quickly dissolving in water after a very short time, about 3 minutes, sufficient to enable the swabbing of the interior of a toilet bowl, at the end of which operation the two plies will separate from each other and from the holder and the swab may then be flushed down the toilet bowl. The corrugations in the lower ply 26 provide a scrubbing, or washboard action, when the swab is applied to the toilet bowl, or other surface to be cleaned, and in addition, form longitudinal chambers 28 between the corrugations and the upper ply 24 adapted to receive a powdered, detergent gel, not shown, which may be forced, or blown, therein. A plurality of tiny apertures 30 are formed in the bottoms of corrugations to permit quick egress of the detergent from said chambers 28 when the swab is applied to the surface to be cleaned.

A pair of notches 32 are provided in the upper ply 24 spaced apart slightly more than the spacing between the outer tines 14 of the holder. These notches are aligned with and overlie a pair of corresponding chambers 28 of the lower ply 26 and form guides for ready entrance of the outer tines into the underlying chambers when the swab 10 is pushed onto the holder from right to left, as viewed in FIG. 1. In assembling the swab and holder it is necessary to bend the swab into an arched form, as illustrated best in FIG. 3, so as to reduce the straight-line spacing between the notches 32 of the swab and enable the outer tines to slide easily into the corresponding corrugation chambers. Bending of the swab results in a tension in the resilient swab tending to straighten the swab to its normal condition and tends to hold the swab tightly on the holder during the short period of its use, in cleaning a toilet bowl for example, and until the swab layers separate and the upper layer disintegrates. The aforesaid bending positions the center tine 20 against the upper surface of the upper ply 24. To facilitate this positioning and to prevent entrance into a corrugation chamber, the center tine is purposely made larger in cross-section than any of the corrugation chambers 28.

After the swab and holder are assembled, in the manner explained above, the lower, corrugated surface 26 of the swab may be applied to the surface of a toilet bowl with a rubbing action for cleaning thereof. After a short time, approximately 3 minutes, the upper ply 24 will separate from the lower ply 26 and begins to disintegrate, or dissolve, in the water within the toilet bowl. The prongs, or tines 14, 20 are, therefore, freed from the swab, and the swab can be flushed down the toilet.

From the preceding description, it is apparent that not only will the swab 10 automatically drop off at the end of a predetermined cleaning period, but the swab, or a replacement, may be easily assembled before cleaning by merely bending the swab into an arcuate form, the chambers in the swab corrugations being somewhat larger in cross-section than the tines 14 which fit loosely into them, permitting ready sliding movement for assembly.

It should be noted that the notches 32 in the upper ply 24 of the swab preferably do not extend the full length of the center tines 14 of the holder. Thus, the free ends of these tines engage the upper ply 24 in areas beyond the notches so as to secure the arched and tensioned swab on the holder in spite of the looseness of the tines in the corrugations.

FIGS. 6 and 8 illustrate another preferred embodiment of the holder more suitable for use in waxing and cleaning floors, ceilings, furniture, and the like. In this embodiment the handle 18′ and center tine 20′ are formed integrally by bending the lower end of the handle at right angle to the upper portion. The center tine is preferably of round section and slightly larger diameter than the two outer tines 14′. The outer tines are connected by a straight base to form a U-shaped member, as in the previous embodiment. However, centrally of the base 16′ is affixed a collar 34 having a bore parallel with the outer tines and revolvably receiving the bottom leg 20′ of the handle. This construction permits the handle 18′ to be swung in a plane perpendicular to the plane of the outer tines to a position nearly parallel to the outer tines for moving a swab under low pieces of furniture, and the like. To limit the swinging movement of the handle, the collar 34 is formed with a peripheral slot 36 extending through an angle of approximately 45° and lying in a plane perpendicular to the axis of the collar. The center tine 20′ at the bottom of the handle is provided with a screw 38, or other abutment, which rides freely in said slot and limits the angular rotation of the handle 18′ upon engagement with the ends of the slot 36.

FIG. 7 illustrates another form of swab which is more suitable for waxing of floors, cleaning of furniture, floors and ceilings, applying sealer to roofs, and the like. This swab is preferably thicker than the swab shown in FIG. 1, and omits the corrugations and the detergent. Preferably, the swab 10′ is formed as a rectangular block of paper, fiber, or rubber material on whose upper and lower surfaces may be applied the wax, detergent, sealer, or other material to be used. A pair of spaced openings 32′ are formed in each of opposite side edges 40, 42 of the block for receiving the outer tines 14′ of the holder. The openings 32′ may extend the full, or only part of the length of the outer tines, and the swab is applied to the holder in the same manner, as described in the FIG. 1 embodiment, by bending the resilient swab into arched form so that the outer tines will be guided into one pair of openings 32′ with the center tine engaging the upper surface of the swab. After the lower side of the swab has been used, the swab may be pulled off the tines and inverted so that the tines fit into the second pair of openings 32′. This reverses the swab, placing the upper surface on the bottom for further use in waxing, cleaning, or the like.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. The combination of a swab with a holder, said swab comprising a relatively thin, flat block of flexible and resilient material, and a pair of spaced openings in one edges of said block for loose reception of a pair of spaced tines on a holder, said block being bendable into an arched shape to receive the holder tines and thereby secure the swab by resilient tension tending to return the swab to normal flat condition, said holder comprising a U-shaped member whose sides form a pair of outer tines spaced apart a lesser distance than the spacing between said openings in said swab, a central tine secured to the base of said member, and a handle extending upwardly from said base at an angle, said holder being engageable with said swab by inserting said outer tines into said openings while bending the swab into a curve to reduce the space between said openings and to engage the center tine with the upper surface of the swab.

2. The combination set forth in claim 1, wherein said swab is provided with a second pair of openings in its opposite edge, whereby said holder may be applied to opposite edges of the swab for alternate use of the upper and lower swab surfaces as cleaning surfaces.

3. The combination as set forth in claim 1, wherein said U-shaped member of the holder includes a collar in its base, said collar having a bore parallel to said outer tines, said center tine being integrally affixed to the lower end of said handle and being rotatably received in said collar.

4. The combination as set forth in claim 3, wherein said collar is provided with a slot in its periphery extending in a plane perpendicular to the axis of the collar, said center tine being provided with a stop member movable in said slot for engagement with the end walls of the slot to limit rotation of the handle in opposite directions.

5. The combination as set forth in claim 1, wherein said swab comprises upper and lower plies, said upper ply being a thin layer of paper-like material which will dissolve or disintegrate in water after a limited period of time, said lower ply being a layer of corrugated material and said two layers being bonded to each other along their meeting surfaces by an adhesive which dissolves in water after a limited period of time.

6. The combination as set forth in claim 5, wherein said lower ply is adapted to receive a detergent within said corrugations, and the walls of said corrguations are pierced by a plurality of spaced, small apertures to permit escape of deteregnt.

References Cited

UNITED STATES PATENTS

| | | | |
|---|---|---|---|
| 748,367 | 12/1903 | Haight | 15—210 |
| 2,755,497 | 7/1956 | Greacen | 401—200 |
| 3,383,158 | 5/1968 | Leland | 401—201 |

EUGENE R. CAPOZIO, Primary Examiner

H. S. SKOGQUIST, Assistant Examiner

U.S. Cl. X.R.

15—144, 210; 401—266